(12) United States Patent
Roustant

(10) Patent No.: US 10,223,396 B2
(45) Date of Patent: Mar. 5, 2019

(54) WORM HASHING

(71) Applicant: salesforce.com, inc., San Francisco, CA (US)

(72) Inventor: Bruno Roustant, Froges (FR)

(73) Assignee: salesforce.com, inc., San Francisco, CA (US)

( * ) Notice: Subject to any disclaimer, the term of this patent is extended or adjusted under 35 U.S.C. 154(b) by 191 days.

(21) Appl. No.: 15/249,271

(22) Filed: Aug. 26, 2016

(65) Prior Publication Data

US 2017/0344545 A1   Nov. 30, 2017

(30) Foreign Application Priority Data

May 27, 2016   (EP) .................................... 16305620

(51) Int. Cl.
*G06F 17/30* (2006.01)

(52) U.S. Cl.
CPC ........ *G06F 17/3033* (2013.01); *G06F 17/303* (2013.01); *G06F 17/30949* (2013.01)

(58) Field of Classification Search
None
See application file for complete search history.

(56) References Cited

U.S. PATENT DOCUMENTS 5,577,188 A    11/1996  Zhu
5,608,872 A     3/1997  Schwartz et al.
5,649,104 A     7/1997  Carleton et al.
5,715,450 A     2/1998  Ambrose et al.
5,761,419 A     6/1998  Schwartz et al.
(Continued)

FOREIGN PATENT DOCUMENTS

WO    WO-2011073680    6/2011

OTHER PUBLICATIONS

Munro, J. I., et al., "Techniques for Collision Resolution in Hash Tables with Open Addressing", Proceedings of the Fall Joint Computer Conference. Dallas, Nov. 2-6, 1986, pp. 601-610.
(Continued)

*Primary Examiner* — Amresh Singh
(74) *Attorney, Agent, or Firm* — Jaffery, Watson, Mendonsa & Hamilton, LLP

(57) ABSTRACT

An entries array having a pre-selected number of initially empty buckets and structured as a circular array is maintained. Each of the pre-selected number of entries in the entries array has a corresponding index value. A chaining array having the pre-selected number of buckets and structured as a circular array is also maintained. Each of the pre-selected number of entries in the chaining array has the same corresponding index value as the corresponding bucket in the entries array. A hash operation is performed on data to be stored to determine a hash value corresponding to the data. The data is stored in a bucket in the entries array corresponding to the hash value as an unmovable head-of-chain entry, and moving previous data, if any, stored in the entries array corresponding to the hash value if the previous data has a different hash value. The data is stored in another bucket in the entries array if the bucket in the entries array corresponding to the hash value is occupied by a head-of-chain entry. The bucket storing the data is linked to the head-of-chain entry with the chaining array.

22 Claims, 12 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2014/0214855 A1* | 7/2014 | Attaluri ............ G06F 17/3033 707/747 |

OTHER PUBLICATIONS

Nimbe, Peter, et al., "An Efficient Strategy for Collision Resolution in Hash Tables", International Journal of Computer Applications, vol. 99, No. 10, Aug. 1, 2014, pp. 35-41.

Extended European Search Report for European Patent Application No. 16305620.3 dated Nov. 22, 2016, 8 pgs.

* cited by examiner

WORM HASHING

PRIORITY AND RELATED APPLICATION DATA

This United States patent application is related to, and claims priority to European Patent Application No. EP16305620, filed on May 27, 2016, entitled "WORM HASHING", which is incorporated herein by reference in its entirety and for all purposes.

TECHNICAL FIELD

Embodiments relate to techniques for data mapping. More particularly, embodiments relate to techniques for efficiently managing mapped data.

BACKGROUND

In general, a hash function is a function that is used to map data to a fixed-size structure, for example, a table or an array. Depending on the design and environment, hash tables can be inefficient because of inefficient memory utilization and/or unnecessarily slow operation, for example, in resolving collisions.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
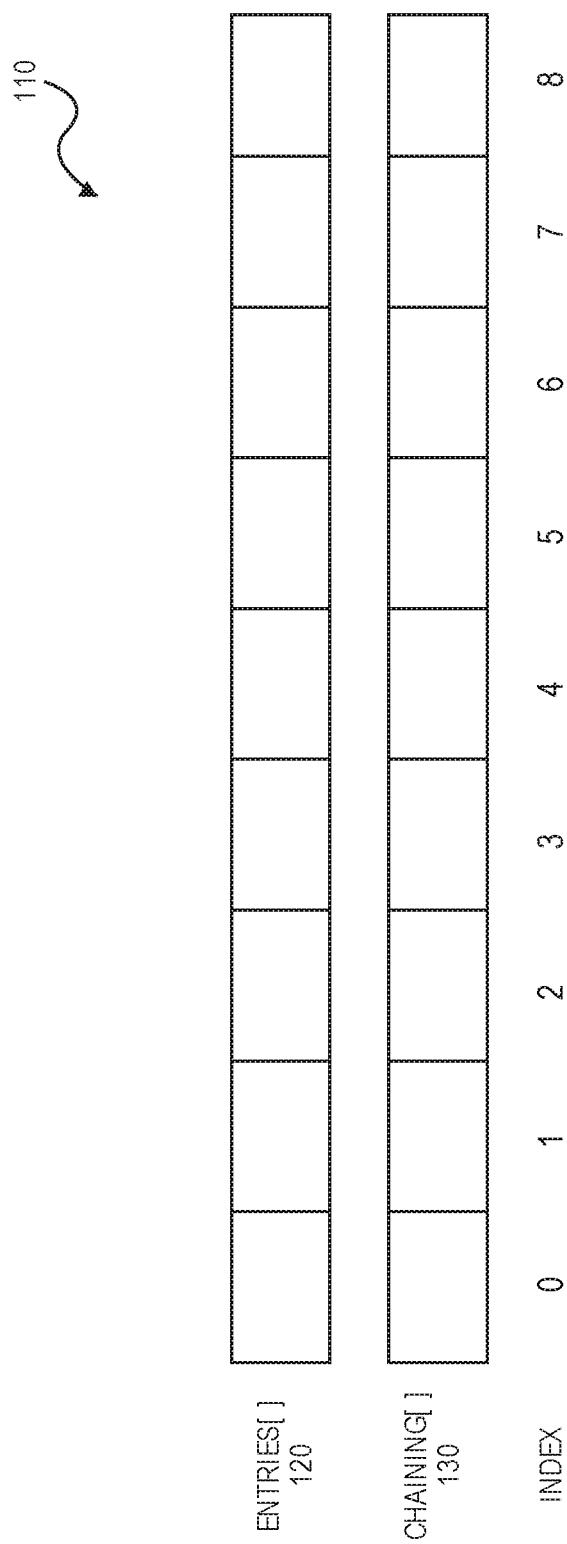
FIG. 1 is a conceptual illustration of one embodiment of a hash structure that can be utilized for the hashing techniques described herein.

In the following description, numerous specific details are set forth. However, embodiments of the invention may be practiced without these specific details. In other instances, well-known circuits, structures and techniques have not been shown in detail in order not to obscure the understanding of this description.

Hashing is a commonly used technique for managing data. However, when hashing strategies are employed, hash collisions will eventually result and these hash collisions must be resolved. Solutions for resolving hash collisions exist, but generally use non-optimal amounts of memory and therefore are not as efficient as possible.

Described herein are strategies for collision resolution in a hash structure that can be referred to as "worm hashing." The techniques described herein can provide a reduced memory footprint, efficient hash structure operations and easy adaptations to primitive keys or values for compactness and performance. The techniques described herein can reduce memory usage by around 50% compared to standard hash tables, without performance loss. The hash structure is even more efficient with primitive keys or values. Hashing can also be used in cryptography.

In one embodiment, chains of entries can be maintained for a single hash value and stored in a bucket array. In one embodiment, an entry chain includes one head-of-chain entry and one or more tail-of-chain entries to manage hash collisions. In one embodiment, the head-of-chain entry is unmovable (i.e., always at the bucket at the index equal to the hash value). In one embodiment, the head-of-chain entry is unmovable at an index equal to the hash value (e.g., h) and each tail-of-chain entry has the same hash value as the head-of-chain entry (e.g., h), but occupies a bucket at a different index (e.g., i). In one embodiment, when a new item is stored in a bucket (e.g., i) as a new head-of-chain entry (e.g., hash=i) a tail-of-chain entry, if any, already in the bucket is moved to another free bucket (e.g., j), but is still chained to the head-of-chain entry having the same hash index (e.g., h). Conceptually, the chained entries with an unmovable head entry and multiple movable tail entries can look like a worm with its head attached to a bucket and the tail moving.

The techniques described herein provide reduced memory usage and cache advantages as compared to separate chaining techniques. In one embodiment, all entry items are stored in the bucket array itself. Thus, the techniques described herein are memory efficient, especially for primitive types. In one embodiment, entries with the same hash value are chained, but the chains are not coalesced. In one embodiment, the resulting hash structure does not exhibit significant clustering effects and can be efficiently filled to a high density (e.g., 0.8-0.9 load factor) without performance loss.

In one embodiment, item lookup results in a single hash computation and potentially an iteration over the chained entries, and does not require linear probing of the bucket array. In one embodiment, an item stored in a bucket can be pushed to a new bucket to make room for a new item to be added to the hashing structure. Some linear probing can be performed to find a new bucket for the item to be moved. Thus, the techniques described herein can be both time and space efficient resulting in a compact hash structure with a high load factor.

FIG. 1 is a conceptual illustration of one embodiment of a hash structure that can be utilized for the hashing techniques described herein. While the hashing techniques are generally described in generic terms with respect to some of the figures, the hashing techniques can be utilized by, for example, a hardware computing device utilizing a memory to organize and manage the hashing structure. The hardware computing device can be, for example, part of a system that can provide a multitenant environment and can manage data to provide various functions within the multitenant environment. Various embodiments of multitenant environments are described in greater detail below.

In the example of FIG. 1, hashing structure 110 includes two arrays. Entries 120 provides an array of entry buckets and chaining 130 provides an array for forward chaining data. In one embodiment, both arrays are organized as circular arrays (i.e., the bucket after the last bucket is the first bucket). In an actual implementation, it may be useful to provide entries array 120 as two distinct arrays (e.g., keys and values).

In one embodiment, chaining array 130 is an integer array (e.g., byte array for space compactness). In the example that follows, chaining[i] represents the offset to the next entry in the chain (e.g., in terms of bytes) with some additional encoding. Thus, $$chaining[i]=0$$

represents an empty free bucket.

In one embodiment, the sign bit is used to encode whether the bucket contains a head or tail entry. In one embodiment, $$chaining[i]>0$$

indicates a head-of-chain entry and $$chaining[i]<0$$

indicates a tail-of-chain entry. In one embodiment, $$absolute(chaining[i])$$

is the forward offset to the next entry in the chain (e.g., a different item having the same hash value). In one embodiment, the arrays are circular, which means that an entry at the end of the array can point to an entry at the beginning of the array with a forward offset.

In one embodiment, a special value is used to mark the end of the chain. In the examples herein, this end of chain value is indicated as 'EOC.' If, for example, the offset value range is 0-127, the head entry can be indicated by 127 (or EOC) and the final tail entry can be indicated by −127 (or −EOC). In this example, the maximum offset is 126 and always forward. Other offset values can also be supported. Reverse offsets can also be supported. In this example, 128 is an unused value.

In one embodiment, when a new entry is added, with the hash value of 'h', there are three possible cases: 1) the bucket at index 'h' is free (i.e., chaining[h]=0); 2) the bucket at index 'h' contains a head-of-chain entry (i.e., chaining[h]>0); or 3) the bucket at index 'h' contains a tail-of-chain entry (i.e., chaining[h]<0).

Figure 2:
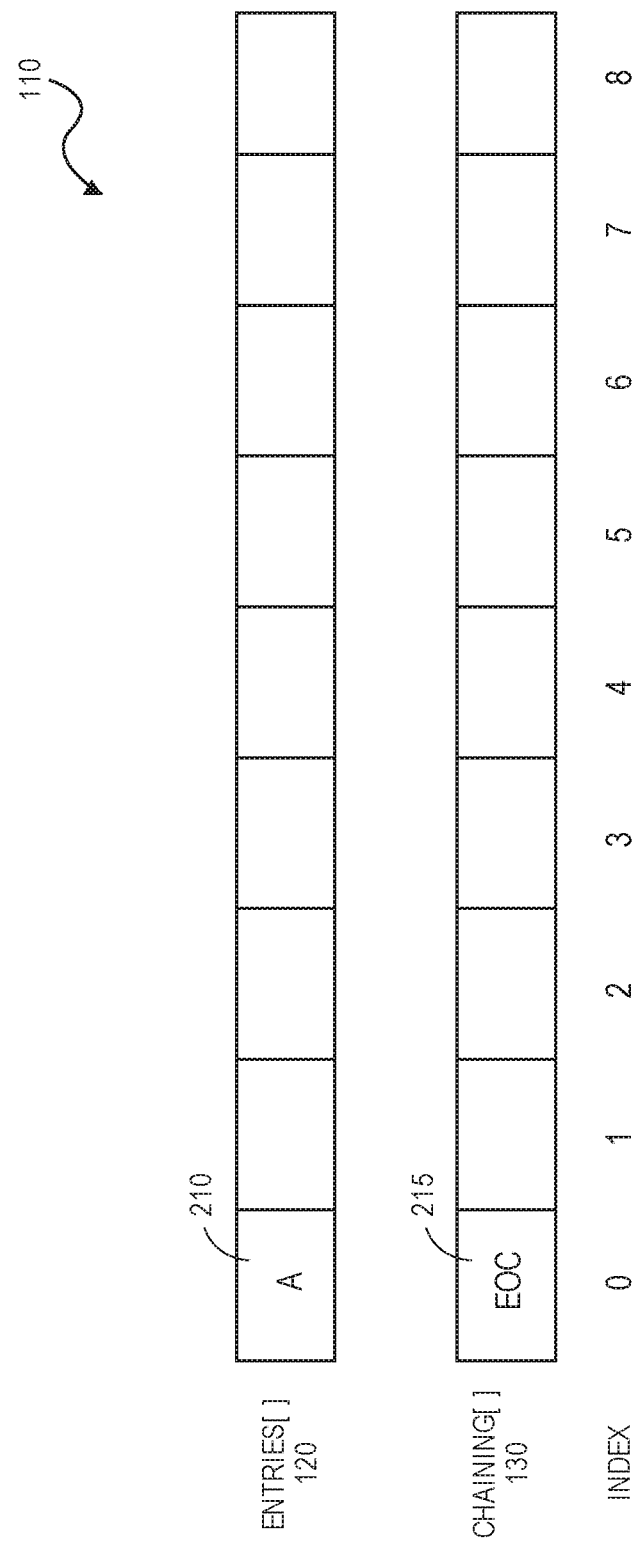
FIG. 2 is a conceptual illustration of one embodiment of a hash structure that can be utilized for the hashing techniques described herein storing a first entry ("A").

FIG. 2 is a conceptual illustration of one embodiment of a hash structure that can be utilized for the hashing techniques described herein storing a first entry ("A"). The example that follows assumes an initially empty map (both entries[ ] 120 and chaining[ ] 130 are empty). For the first case above, the map is empty, and the new entry "A" has a hash value of 0. First, the system checks chaining[ ] 130 at index 0 (i.e., chaining[0]) and determines that the current value is 0, which indicates that the bucket at index 0 is free.

The system then sets entries[0] to "A" (210) and chaining [0] to "EOC" (e.g., 215). In one embodiment, EOC is the end-of-chain value (e.g., 127 for a one-byte offset value) marking the end of an entry chain. In the example of FIG. 2, the value at chaining[0] 215 is positive to indicate that the bucket contains the head-of-chain entry.

Figure 3:
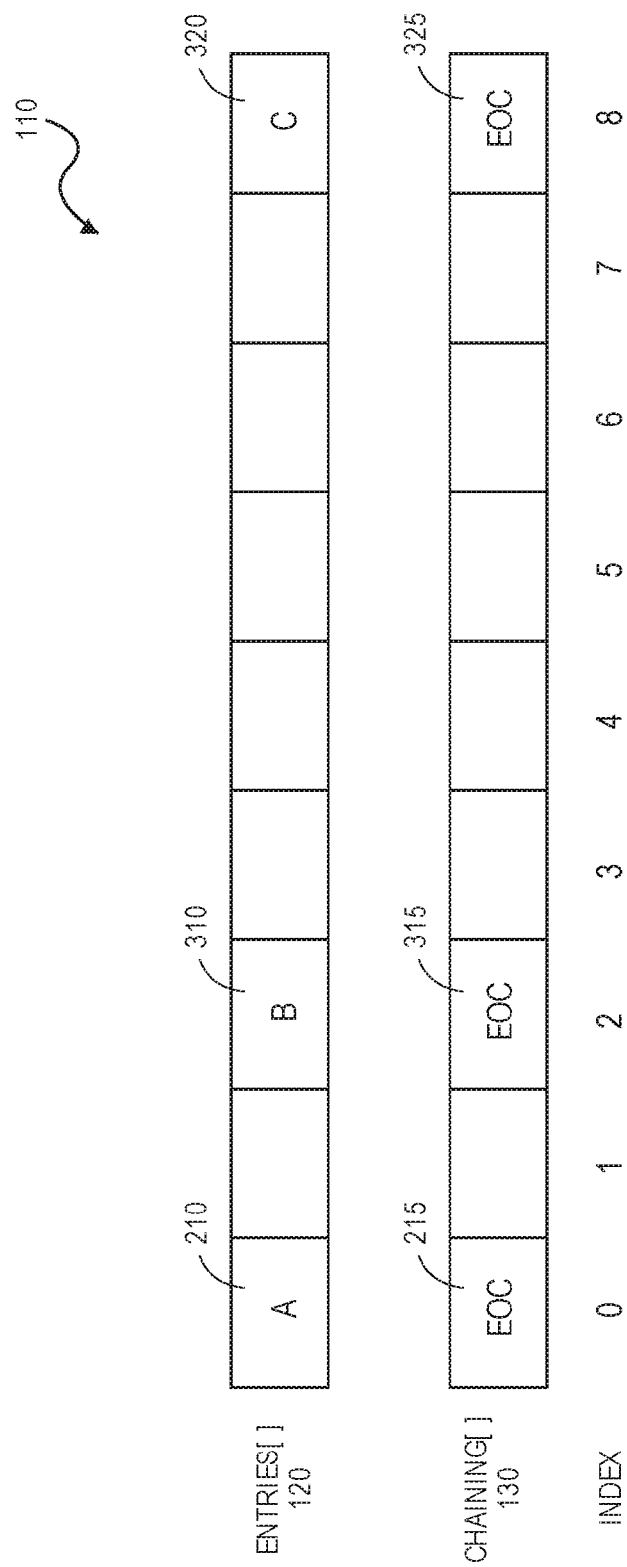
FIG. 3 is a conceptual illustration of one embodiment of a hash structure that can be utilized for the hashing techniques described herein storing a second entry ("B") and a third entry ("C").

FIG. 3 is a conceptual illustration of one embodiment of a hash structure that can be utilized for the hashing techniques described herein storing a second entry ("B") and a third entry ("C"). The example of FIG. 3 continues the example of FIG. 2 by adding new entries "B" and "C" with the respective hash values of 2 and 8. Because the only previous entry in entries[ ] 120 is entry A 210 at index 0, there are no hash collisions. Thus, the system sets entries[2] to "B" (310) and entries[8] to "C" (320). Both new entries are head-of-chain entries, so the corresponding values in chaining[ ] 130 are EOC (i.e., 315 and 325).

Figure 4:
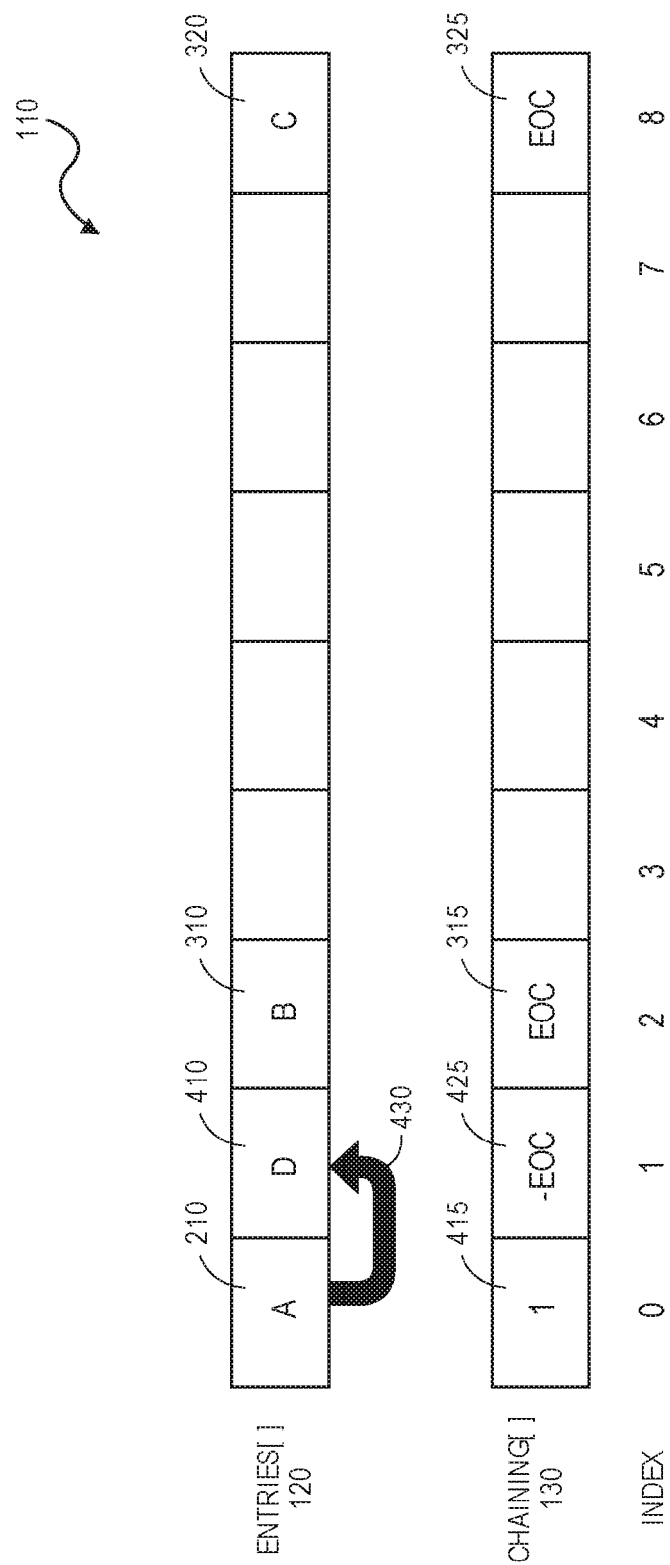
FIG. 4 is a conceptual illustration of one embodiment of a hash structure that can be utilized for the hashing techniques described herein storing a fourth entry ("D").

FIG. 4 is a conceptual illustration of one embodiment of a hash structure that can be utilized for the hashing techniques described herein storing a fourth entry ("D"). In the example of FIG. 4, the new entry, D, has a hash value of 0. The system checks chaining[ ] 130 at offset 0 and (215 in FIG. 3) chaining[0]>0, so the bucket at index 0 corresponds to the head-of-chain. The system then follows the entry chain up to the last entry in the chain. Because absolute (chaining[0])=EOC (215 in FIG. 3), this is the last entry in the entry chain.

In one embodiment, from the last entry of the chain (index 0), the next free bucket is found, for example, by linear probing to the right (in a circular array). In one embodiment, if no free bucket can be found in the range of the maximum offset (e.g., 126), then the map can be enlarged, rehashed and the new entry added. In the example of FIG. 4, the system first checks the bucket at index 1, which is available.

The system sets entries[1] to "D" (410) and links the new entry to the entry chain, 430. Because chaining[x] is the offset from index x to the next entry in the chain, if the next entry is at index y, then chaining[x]=y-x. The system also changes chaining[0] from EOC (215 in FIG. 3) to "1" (415). The chaining[0] value is positive because the entry at index 0 is the head-of-chain. The system further sets chaining[1] to "−EOC" (425) because the entry at index 1 is the end of the entry chain and is a tail-of-chain. Thus, the chaining offset of the entry is negative.

Figure 5:
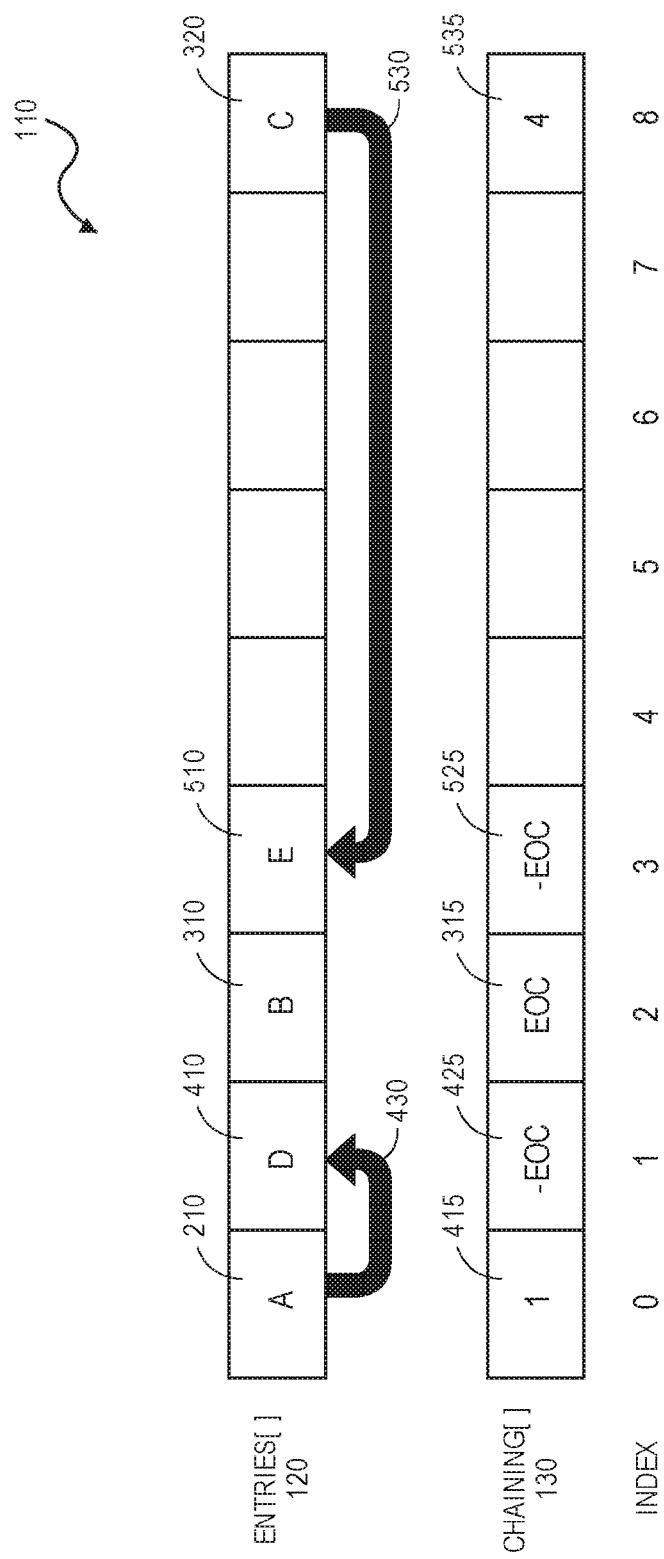
FIG. 5 is a conceptual illustration of one embodiment of a hash structure that can be utilized for the hashing techniques described herein storing a fifth entry ("E").

FIG. 5 is a conceptual illustration of one embodiment of a hash structure that can be utilized for the hashing techniques described herein storing a fifth entry ("E"). In the example of FIG. 5, entry E has a hash value of 8. The system checks chaining[ ] 130 at index 8 and finds chaining[8]>0 (325 in FIG. 4), which means that the bucket at index 8 contains a head-of-chain entry.

The system then follows the entry chain up to the last entry of the chain. In this example, absolute(chaining[8])=EOC (325 in FIG. 4), which indicates that entry 320 is the last entry in the chain. In one embodiment, from the last entry in the chain, the system finds the next free bucket, for example, by linear probing to the right. In the example of FIG. 5, the next circular index is 0, which is occupied. Linear probing continues until a free bucket is found, which is index 3 in the example.

The system puts the new entry, E, in the available bucket (510) and links (530) the new entry to the chain. In one embodiment, linking is accomplished by setting entries[3] to "E" (510) and chaining[3] to "−EOC" (525). The system further sets chaining[8] to 4 (535), which is a circular offset from 8 to 3. The value in chaining[8] is positive to indicate that the entry is a head-of-chain entry.

Figure 6:
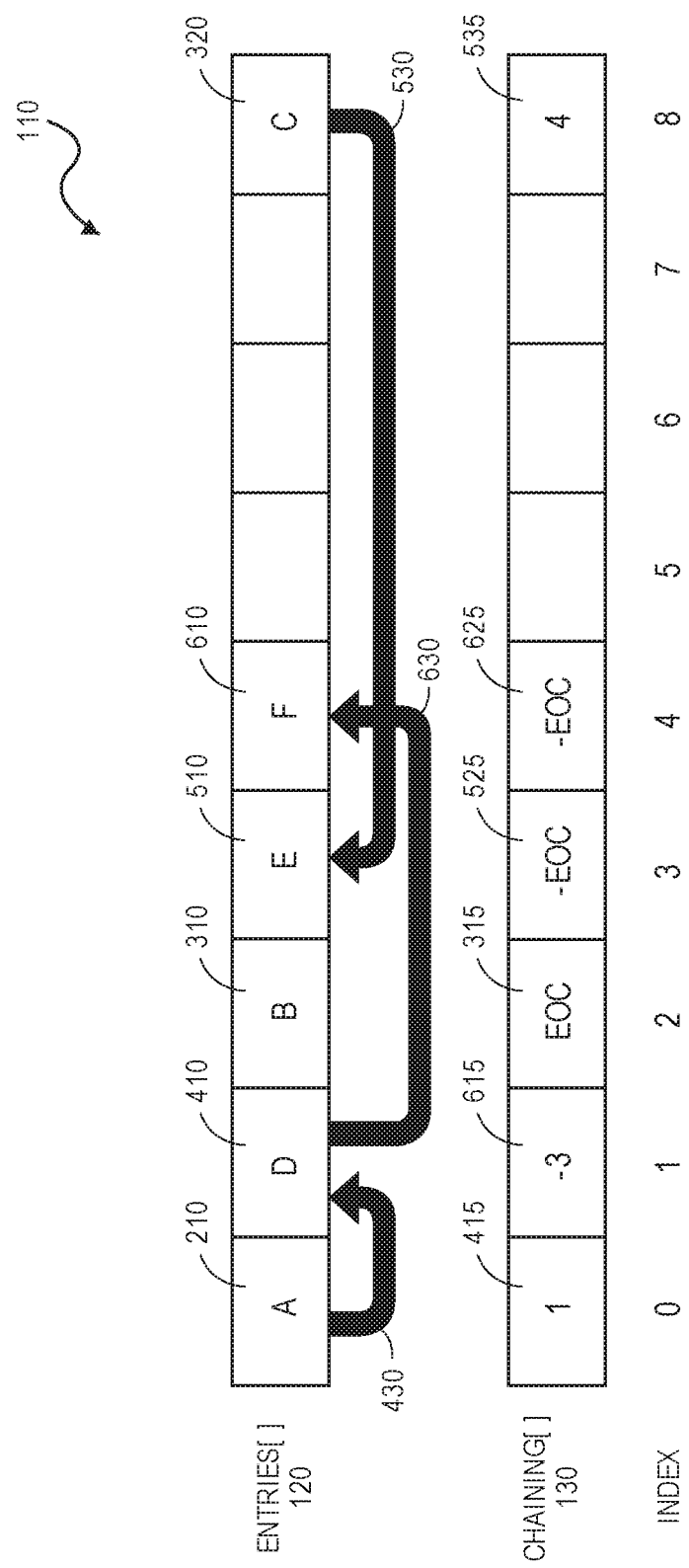
FIG. 6 is a conceptual illustration of one embodiment of a hash structure that can be utilized for the hashing techniques described herein storing a sixth entry ("F").

FIG. 6 is a conceptual illustration of one embodiment of a hash structure that can be utilized for the hashing techniques described herein storing a sixth entry ("F"). In the example of FIG. 6, entry F has a hash value of 0. The system checks chaining[ ] 130 at index 0 and finds chaining[0]>0 (415 in FIG. 5), which means that the bucket at index 0 contains a head-of-chain entry.

The system then follows the entry chain up to the last entry of the chain. In this example, starting at index 0, chaining[1]=0, so the next index=current index (0)+offset (1)=1. Thus, the next entry in the chain is at index 1. Chaining[1]=−EOC (425 in FIG. 5), which means entry 410 is the last entry in the chain.

In one embodiment, from the last entry in the chain, the system finds the next free bucket, for example, by linear probing to the right. Thus, the next entry is at index 2, which is occupied (EOC entry 315). Similarly, the next entry is at index 3, which is also occupied (−EOC entry 525). The next free entry is at index 4, which is an empty bucket.

The system puts the new entry, F, in the available bucket (610) and links (630) the new entry to the chain. In one embodiment, linking is accomplished by setting entries[4] to "F" (610), and chaining[4] to "−EOC" (625) and chaining[1] to −3.

Figure 7:
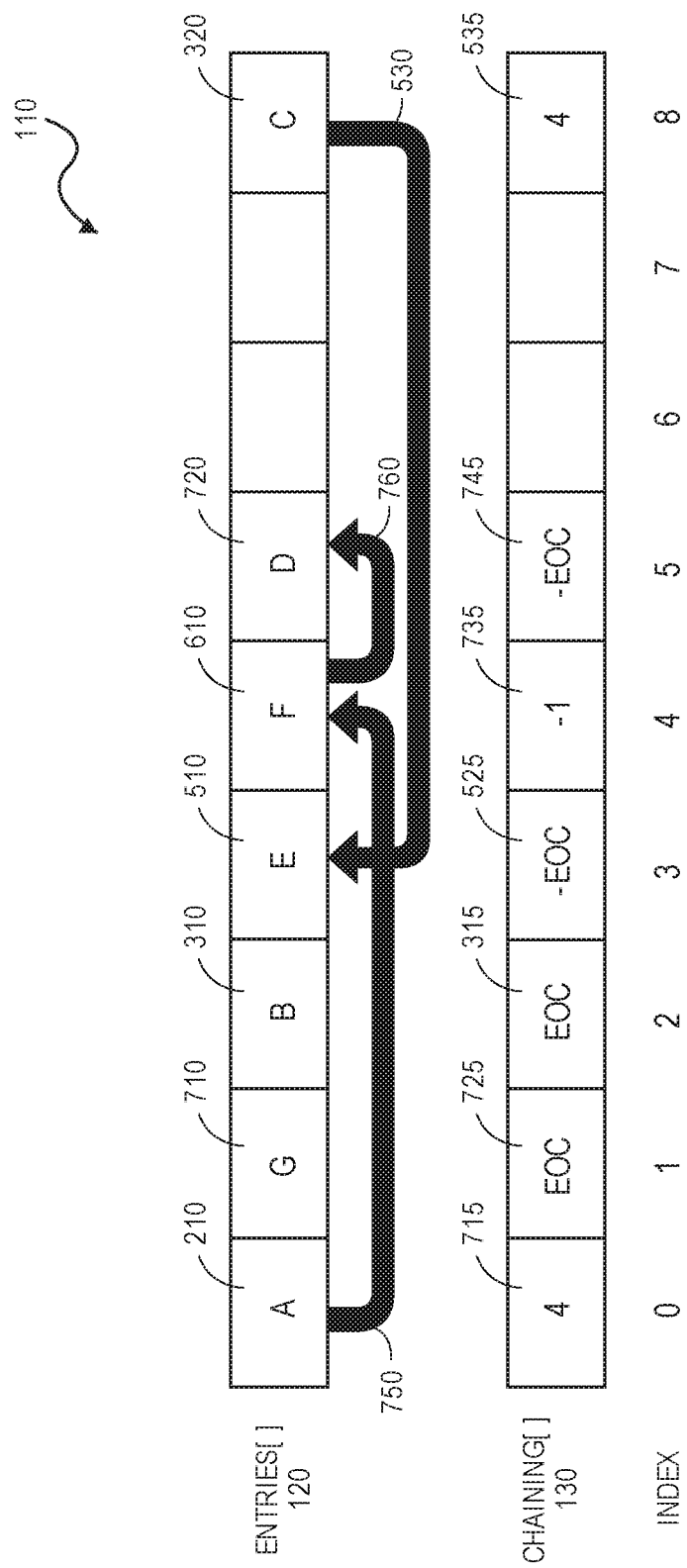
FIG. 7 is a conceptual illustration of one embodiment of a hash structure that can be utilized for the hashing techniques described herein storing a seventh entry ("G").

FIG. 7 is a conceptual illustration of one embodiment of a hash structure that can be utilized for the hashing techniques described herein storing a seventh entry ("G"). In the example of FIG. 7, entry G has a hash value of 1. In one embodiment, the system checks chaining[ ] 130 at index 1. In the example, chaining[1]>0 (615 in FIG. 6), so the bucket at index 1 contains a movable tail-of-chain.

In one embodiment, the tail-of-chain entry (410 in FIG. 6) is moved to a free bucket, 720, while maintaining the linking within the chain (750, 760). In one embodiment, to maintain forward chaining, the entry can be moved within the maximum range (e.g., 126 entries) of the last entry in the chain. In one embodiment, each entry in the chain adds another maximum range (e.g., 126) number of entries. In one embodiment, the entry is moved to the next available entry within the maximum range.

In one embodiment, if a free bucket is found before the next entry in the chain, the current tail-of-chain entry is moved to the free bucket and the chain links (e.g., 735, 745) are updated. In one embodiment, if the next entry is within the maximum offset range of the previous entry in the chain, and there is a free bucket (e.g., found by linear probing) after the last entry in the chain and within the maximum offset range, the current tail-of-chain entry is moved to the free bucket and becomes the new tail-of-chain, the previous link (e.g., 735) is modified to point the to next entry in the chain and the chain links are updated. In one embodiment, if no free buckets are found, the structure is enlarged, re-hashed and the new entry is added to the new, larger structure.

In one embodiment, the system places the new entry in the freed bucket (710) as head-of-chain. Thus, entries[1] is set to G (710) and chaining[1] is set to EOC (725). With this tail-of-chain displacement and rehashing when no free bucket is found by linear probing within the maximum offset range, the techniques described herein can provide an advantageous load factor (e.g., 0.75 or higher). Various embodiments described below load factors can be further increase load factors.

The examples above provide strategies for storing and/or maintaining entries. To look up an entry with a hash value of 'h' the system determines the value at index 'h' within chaining[ ]. If chaining[h]<=0, then the system returns no entry. For example, if there is a tail-of-chain entry at index 'h,' but that entry does not have the same hash, the system should return no entry. If chaining[h]>0, the system follows the entry chain and compares the lookup key with each entry. Thus, entry lookup is relatively straight forward and performance is not impacted by load factor. There is no linear probing because only entries in the chain (hash collisions) are iterated. Overall an entry lookup takes constant time on average, as it is well established in the field of hash tables.

Figure 8:
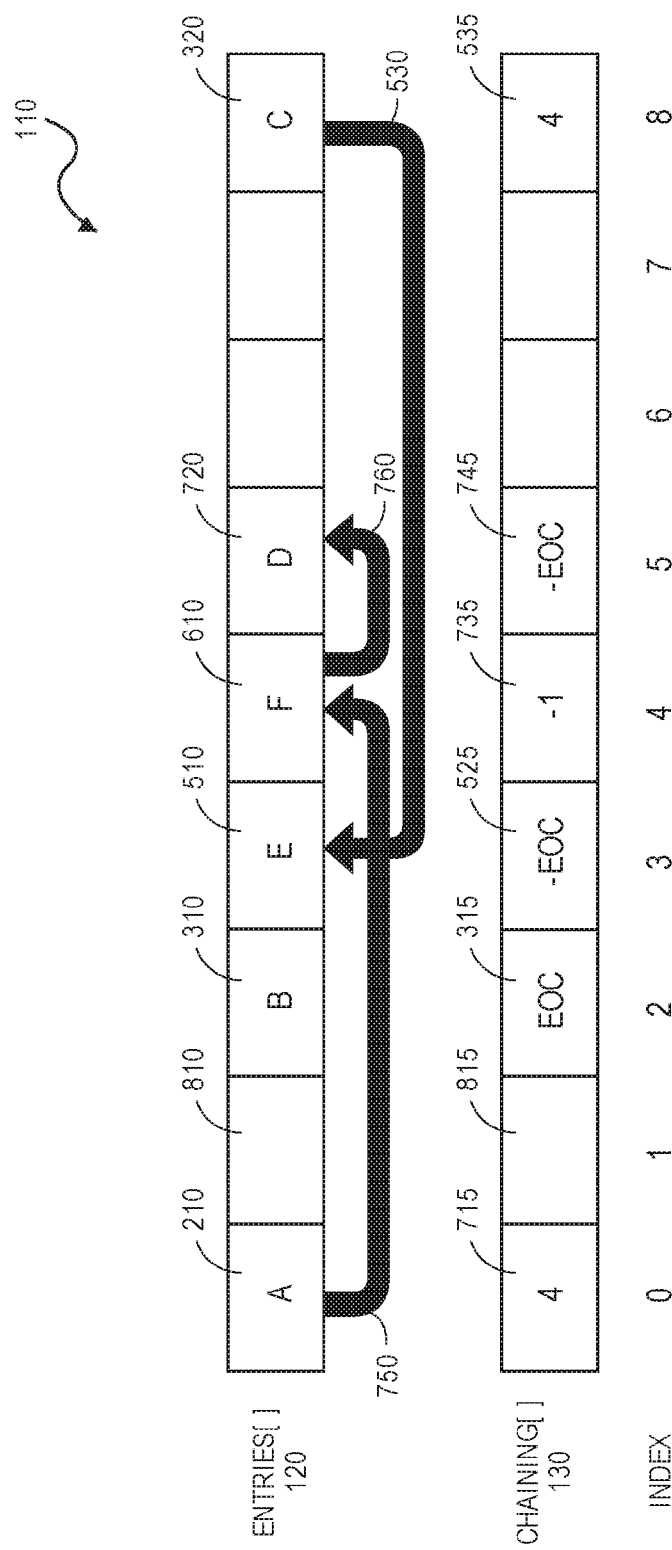
FIG. 8 is a conceptual illustration of one embodiment of a hash structure after removing an entry ("G") from the hash structure of FIG. 7.

FIG. 8 is a conceptual illustration of one embodiment of a hash structure after removing an entry ("G") from the hash structure of FIG. 7. In the example of FIG. 8, entry G has a hash value of 1. In one embodiment, the system checks chaining[ ] 130 at index 1. If chaining[1]<=0, there would be no match and no entry to remove. In the example, chaining[1]>0 (EOC 725 in FIG. 7), so the bucket at index 1 contains a head-of-chain.

In one embodiment, the system iterates over all entries in the chain. When a match is found, that entry is to be removed. If there is no match, there is no removal. In one embodiment, the system operates to remove the matching entry and replace it with the last entry in the chain. In the example of FIG. 8, the entry at entries[1] is removed (810). Because absolute(chaining[1])=EOC (725 in FIG. 7), the corresponding entry is the last entry of the chain. The "EOC" at chaining[1] is removed (815). So, entry "G" is removed and the bucket is freed.

Figure 9:
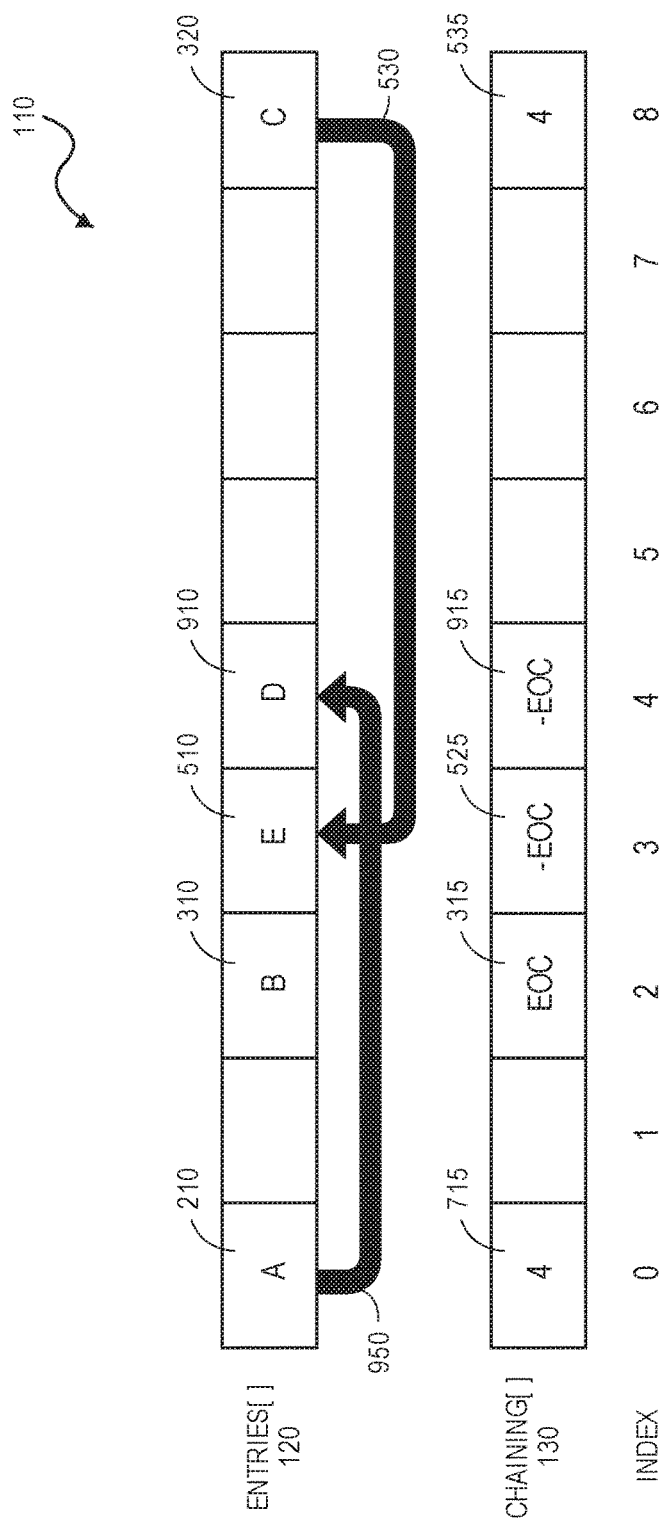
FIG. 9 is a conceptual illustration of one embodiment of a hash structure after removing an entry ("F") from the hash structure of FIG. 8.

FIG. 9 is a conceptual illustration of one embodiment of a hash structure after removing an entry ("F") from the hash structure of FIG. 8. In the example of FIG. 9, entry F has a hash value of 0. In one embodiment, the system checks chaining[ ] 130 at index 0. In the example, chaining[0]>0 (715 in FIG. 8), so the bucket at index 0 contains a head-of-chain. The system iterates over all of the entries in the chain, and entries[4] matches "F" (610 in FIG. 8) so that entry is removed.

In one embodiment, the entry is removed and it is replace by the last entry in the chain, which is "D" in the example (910). Starting from entry F at index 4, chaining[4]=−1 (735 in FIG. 8), so the system iterates to index 4+abs(−1)=5 (chaining[5]). In the example, chaining[5]=−EOC (745 in FIG. 8) and is the last entry in the chain. Entry "F" is replaced by entry "D" (910) and chaining[4] is updated (915, 950).

In some of the embodiments described above, re-hashing can be utilized for the full structure if the system cannot find a free bucket. Re-hashing the whole structure is a costly operation, so it is more efficient to do re-hashing as infrequently as possible. Further, memory usage is more compact and efficient when more entries are stored without re-hashing.

In one embodiment, a recursive tail-of-chain displacement strategy can be employed. For example, when the system cannot find a free bucket (e.g., via linear probing) to displace a tail-of-chain entry, it can attempt to recursively displace some other tail-of-chain entries within the offset range belonging to any entry chain, not necessarily the current entry chain. In one embodiment, the number of recursive attempts can be limited so as to reduce the potential impact on performance. For example, 10 attempts at recursive level 1 and one attempt at recursive level 2 can be allowed. Other limits can also be utilized. This recursive displacement strategy can further improve the load factor to the 0.85-0.9 range (or possibly better).

The techniques described above can be applied in many different environments and applications in which other hashing strategies have been used previously. For example, in database indexing, to implement caches, implementation of objects in dynamic programming languages, and various other uses.

In one embodiment, a non-transitory computer-readable medium stores instructions that can be executed by one or more processors. Execution of the instructions by the one or more processors cause the one or more processors to maintain an entries array having a pre-selected number of initially empty buckets and structured as a circular array. Each of the pre-selected number of entries in the entries array has a corresponding index value.

Execution of the instructions by the one or more processors cause the one or more processors to maintain a chaining array having the pre-selected number of buckets and structured as a circular array. Each of the pre-selected number of entries in the chaining array has the same corresponding index value as the corresponding bucket in the entries array. Execution of the instructions by the one or more processors cause the one or more processors to perform a hash operation on data to be stored to determine a hash value corresponding to the data.

Execution of the instructions by the one or more processors cause the one or more processors to store the data in a bucket in the entries array corresponding to the hash value as an unmovable head-of-chain entry, and movie previous data, if any, stored in the entries array corresponding to the hash value if the previous data has a different hash value.

Execution of the instructions by the one or more processors cause the one or more processors to store the data in another bucket in the entries array if the bucket in the entries array corresponding to the hash value is occupied by a head-of-chain entry. Execution of the instructions by the one or more processors cause the one or more processors to link the bucket storing the data to the head-of-chain entry with the chaining array.

In one embodiment, a sign bit in the corresponding chaining array entry indicates whether the corresponding entries array bucket contains a head-of-chain entry or a tail-of-chain entry. In one embodiment, execution of the instructions causes the one or more processors to cause the one or more processors to displace a movable tail-of-chain entry from the bucket in the entries array corresponding to the hash value to a free bucket within the entries array.

In one embodiment, the free bucket within the entries array is within a maximum chaining range. In one embodiment, execution of the instructions causes the one or more processors to find the free bucket by analyzing the entries array within a maximum chaining range. In one embodiment, analyzing the entries comprises linear probing up to the maximum chaining range.

In one embodiment, execution of the instructions causes the one or more processors to recursively displace one or more tail-of-chain entries in the entries array to free a bucket to add new data in the entries array when there is no free bucket available within the maximum chaining range. In one embodiment, execution of the instructions causes the one or more processors to enlarge both the entries array and the chaining array if no free bucket can be found within a maximum chaining range through recursive displacement.

In one embodiment, execution of the instructions causes the one or more processors to re-hash and resort data stored in buckets of the entries array in response to enlargement of the entries array and the chaining array. In one embodiment, execution of the instructions causes the one or more processors to enlarge both the entries array and the chaining array if no free bucket can be found within a maximum chaining range.

In one embodiment, a method includes maintaining, with one or more processors, an entries array having a pre-selected number of initially empty buckets and structured as a circular array. Each of the pre-selected number of entries in the entries array has a corresponding index value. The one or more processors also maintain a chaining array having the pre-selected number of buckets and structured as a circular array. Each of the pre-selected number of entries in the chaining array has the same corresponding index value as the corresponding bucket in the entries array.

The one or more processors perform a hash operation on data to be stored to determine a hash value corresponding to the data. The one or more processors store the data in a bucket in the entries array corresponding to the hash value as an unmovable head-of-chain entry, and move previous data, if any, stored in the entries array corresponding to the hash value if the previous data has a different hash value.

The one or more processors store the data in another bucket in the entries array if the bucket in the entries array corresponding to the hash value is occupied by a head-of-chain entry. The one or more processors link the bucket storing the data to the head-of-chain entry with the chaining array.

In one embodiment, a sign bit in the corresponding chaining array entry indicates whether the corresponding entries array bucket contains a head-of-chain entry or a tail-of-chain entry. In one embodiment, execution of the instructions causes the one or more processors to cause the one or more processors to displace a movable tail-of-chain entry from the bucket in the entries array corresponding to the hash value to a free bucket within the entries array.

In one embodiment, the free bucket within the entries array is within a maximum chaining range. In one embodiment, execution of the instructions causes the one or more processors to find the free bucket by analyzing the entries array within a maximum chaining range. In one embodiment, analyzing the entries comprises linear probing up to the maximum chaining range.

In one embodiment, execution of the instructions causes the one or more processors to recursively displace one or more tail-of-chain entries in the entries array to free a bucket to add new data in the entries array when there is no free bucket available within the maximum chaining range. In one embodiment, execution of the instructions causes the one or more processors to enlarge both the entries array and the chaining array if no free bucket can be found within a maximum chaining range through recursive displacement.

In one embodiment, execution of the instructions causes the one or more processors to re-hash and resort data stored in buckets of the entries array in response to enlargement of the entries array and the chaining array. In one embodiment, execution of the instructions causes the one or more processors to enlarge both the entries array and the chaining array if no free bucket can be found within a maximum chaining range.

Figure 10:
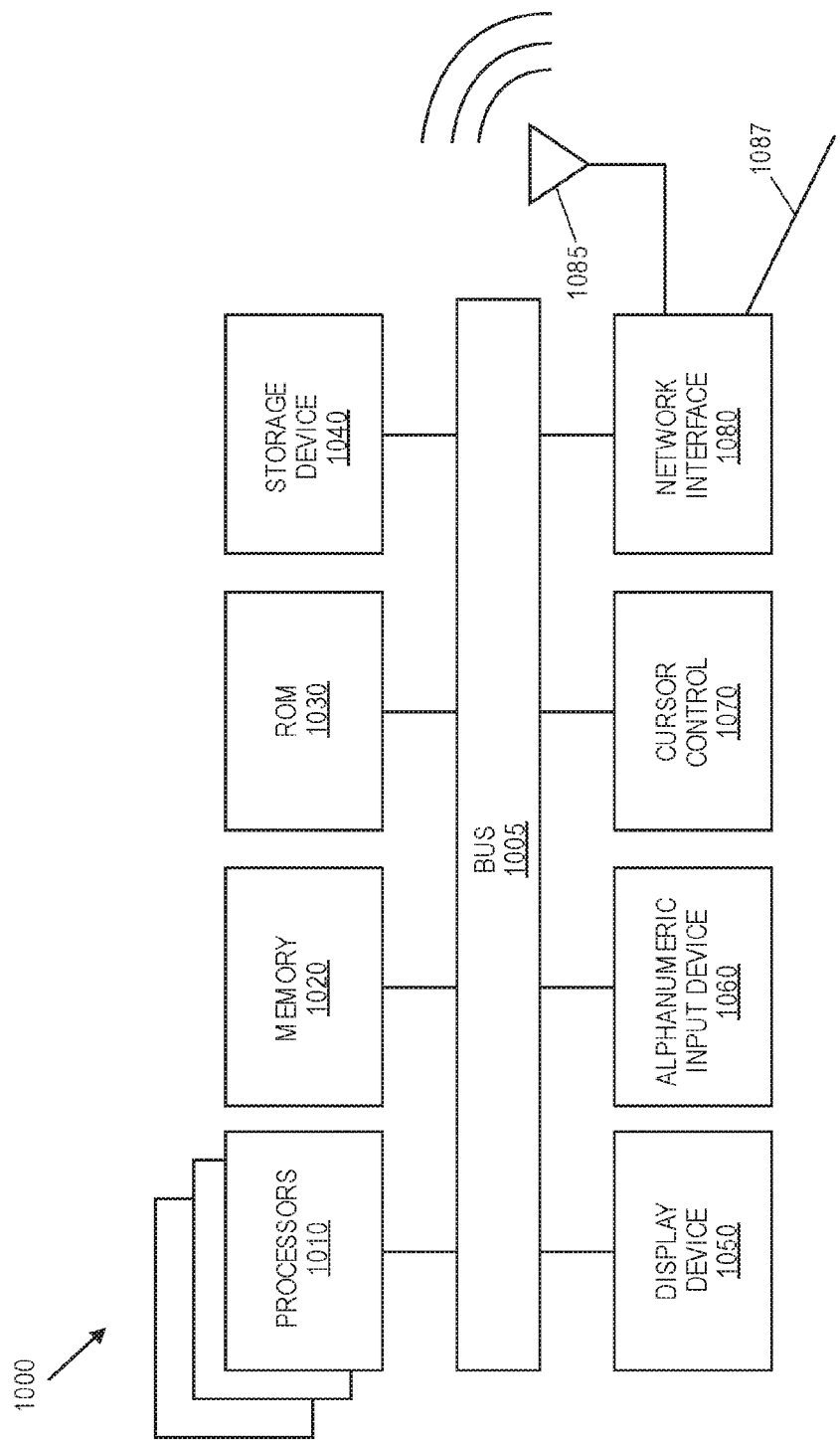
FIG. 10 is a block diagram of one embodiment of an electronic system.

FIG. 10 is a block diagram of one embodiment of an electronic system. The electronic system illustrated in FIG. 10 is intended to represent a range of electronic systems (either wired or wireless) including, for example, desktop computer systems, laptop computer systems, cellular telephones, smartphones, tablets, wearable computing devices, etc. Alternative electronic systems may include more, fewer and/or different components.

Electronic system 1000 can operate to utilize the hashing architectures and functionality described above. In one embodiment, electronic system 1000 can be configured to execute instructions that are configurable, when executed, to provide the hashing architectures and functionality described herein. In one embodiment, electronic system 1000 can be part of an on-demand services environment that includes multiple hardware computing devices and associated memory. In one embodiment, the on-demand services environment can be a multitenant environment providing, for example, database functionality, sales management, services management, etc. Various embodiments of on-demand services environments are provided below.

Electronic system 1000 includes bus 1005 or other communication device to communicate information, and processor 1010 coupled to bus 1005 that may process information. While electronic system 1000 is illustrated with a single processor, electronic system 1000 may include multiple processors and/or co-processors. Electronic system 1000 further may include random access memory (RAM) or other dynamic storage device 1020 (referred to as main memory), coupled to bus 1005 and may store information and instructions that may be executed by processor 1010. Main memory 1020 may also be used to store temporary variables or other intermediate information during execution of instructions by processor 1010.

Electronic system 1000 may also include read only memory (ROM) and/or other static storage device 1030 coupled to bus 1005 that may store static information and instructions for processor 1010. Data storage device 1040 may be coupled to bus 1005 to store information and instructions. Data storage device 1040 such as a magnetic disk or optical disc and corresponding drive may be coupled to electronic system 1000.

Electronic system 1000 may also be coupled via bus 1005 to display device 1050, such as a cathode ray tube (CRT) or liquid crystal display (LCD), to display information to a user. Alphanumeric input device 1060, including alphanumeric and other keys, may be coupled to bus 1005 to communicate information and command selections to processor 1010. Another type of user input device is cursor control 1070, such as a mouse, a trackball, or cursor direction keys to communicate direction information and command selections to processor 1010 and to control cursor movement on display 1050.

Electronic system 1000 further may include network interface(s) 1080 to provide access to a network, such as a local area network. Network interface(s) 1080 may include, for example, a wireless network interface having antenna 1085, which may represent one or more antenna(e). Network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, network interface(s) 1080 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 11:
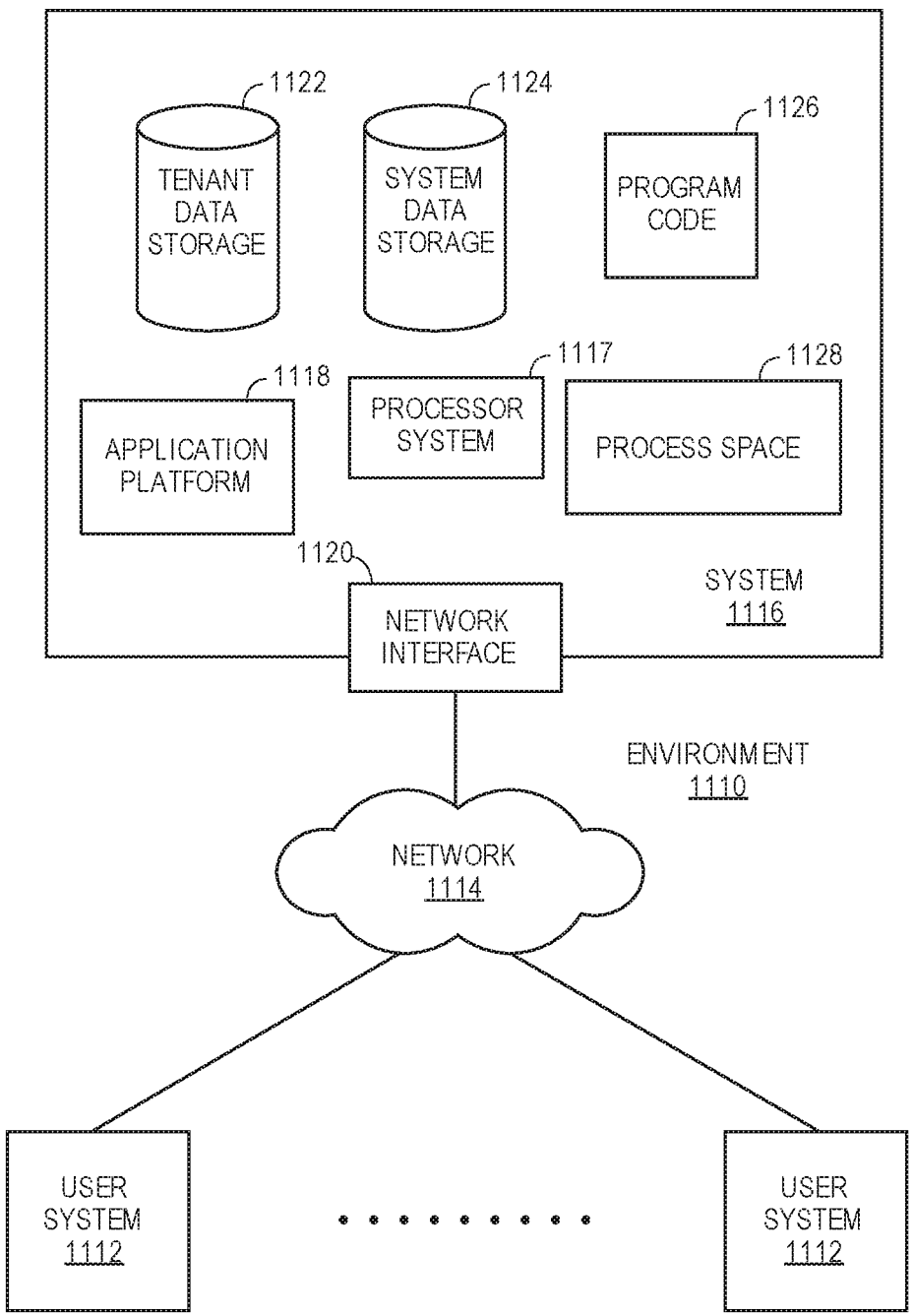
FIG. 11 illustrates a block diagram of an environment where an on-demand database service might be provided.

FIG. 11 illustrates a block diagram of an environment 1110 wherein an on-demand database service might be used. Environment 1110 may include user systems 1112, network 1114, system 1116, processor system 1117, application platform 1118, network interface 1120, tenant data storage 1122, system data storage 1124, program code 1126, and process space 1128. In other embodiments, environment 1110 may not have all of the components listed and/or may have other elements instead of, or in addition to, those listed above.

Environment 1110 is an environment in which an on-demand database service exists. User system 1112 may be any machine or system that is used by a user to access a database user system. For example, any of user systems 1112 can be a handheld computing device, a mobile phone, a laptop computer, a work station, and/or a network of computing devices. As illustrated in herein FIG. 11 (and in more detail in FIG. 12) user systems 1112 might interact via a network 1114 with an on-demand database service, which is system 1116.

An on-demand database service, such as system 1116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1116" and "system 1116" will be used interchangeably herein. A database image may include one or more database objects. A relational database management system (RDMS) or the equivalent may execute storage and retrieval of information against the database object(s). Application platform 1118 may be a framework that allows the applications of system 1116 to run, such as the hardware and/or software, e.g., the operating system. In an embodiment, on-demand database service 1116 may include an application platform 1118 that enables creation, managing and executing one or more applications developed by the provider of the on-demand database service, users accessing the on-demand database service via user systems 1112, or third party application developers accessing the on-demand database service via user systems 1112.

The users of user systems 1112 may differ in their respective capacities, and the capacity of a particular user system 1112 might be entirely determined by permissions (permission levels) for the current user. For example, where a salesperson is using a particular user system 1112 to interact with system 1116, that user system has the capacities allotted to that salesperson. However, while an administrator is using that user system to interact with system 1116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1114 is any network or combination of networks of devices that communicate with one another. For example, network 1114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 1112 might communicate with system 1116 using TCP/IP and, at a higher network level, use other common Internet protocols to communicate, such as HTTP, FTP, AFS, WAP, etc. In an example where HTTP is used, user system 1112 might include an HTTP client commonly referred to as a "browser" for sending and receiving HTTP messages to and from an HTTP server at system 1116. Such an HTTP server might be implemented as the sole network interface between system 1116 and network 1114, but other techniques might be used as well or instead. In some implementations, the interface between system 1116 and network 1114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1116, shown in FIG. 11, implements a web-based customer relationship management (CRM) system. For example, in one embodiment, system 1116 includes application servers configured to implement and execute CRM software applications as well as provide related data, code, forms, webpages and other information to and from user systems 1112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1116 implements applications other than, or in addition to, a CRM application. For example, system 1116 may provide tenant access to multiple hosted (standard and custom) applications, including a CRM application. User (or third party developer) applications, which may or may not include CRM, may be supported by the application platform 1118, which manages creation, storage of the applications into one or more database objects and executing of the applications in a virtual machine in the process space of the system 1116.

One arrangement for elements of system 1116 is shown in FIG. 11, including a network interface 1120, application platform 1118, tenant data storage 1122 for tenant data 1123, system data storage 1124 for system data 1125 accessible to system 1116 and possibly multiple tenants, program code 1126 for implementing various functions of system 1116, and a process space 1128 for executing MTS system processes and tenant-specific processes, such as running applications as part of an application hosting service. Additional processes that may execute on system 1116 include database indexing processes.

Several elements in the system shown in FIG. 11 include conventional, well-known elements that are explained only briefly here. For example, each user system 1112 could include a desktop personal computer, workstation, laptop, PDA, cell phone, or any wireless access protocol (WAP) enabled device or any other computing device capable of interfacing directly or indirectly to the Internet or other network connection. User system 1112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1112 to access, process and view information, pages and applications available to it from system 1116 over network 1114. Each user system 1112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1116 or other systems or servers. For example, the user interface device can be used to access data and applications hosted by system 1116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1112 and all of its components are operator configurable using applications, such as a browser, including computer code run using a central processing unit such as an Intel Pentium® processor or the like. Similarly, system 1116 (and additional instances of an MTS, where more than one is present) and all of their components might be operator configurable using application(s) including computer code to run using a central processing unit such as processor system 1117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1116 is configured to provide webpages, forms, applications, data and media content to user (client) systems 1112 to support the access by user systems 1112 as tenants of system 1116. As such, system 1116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 12:
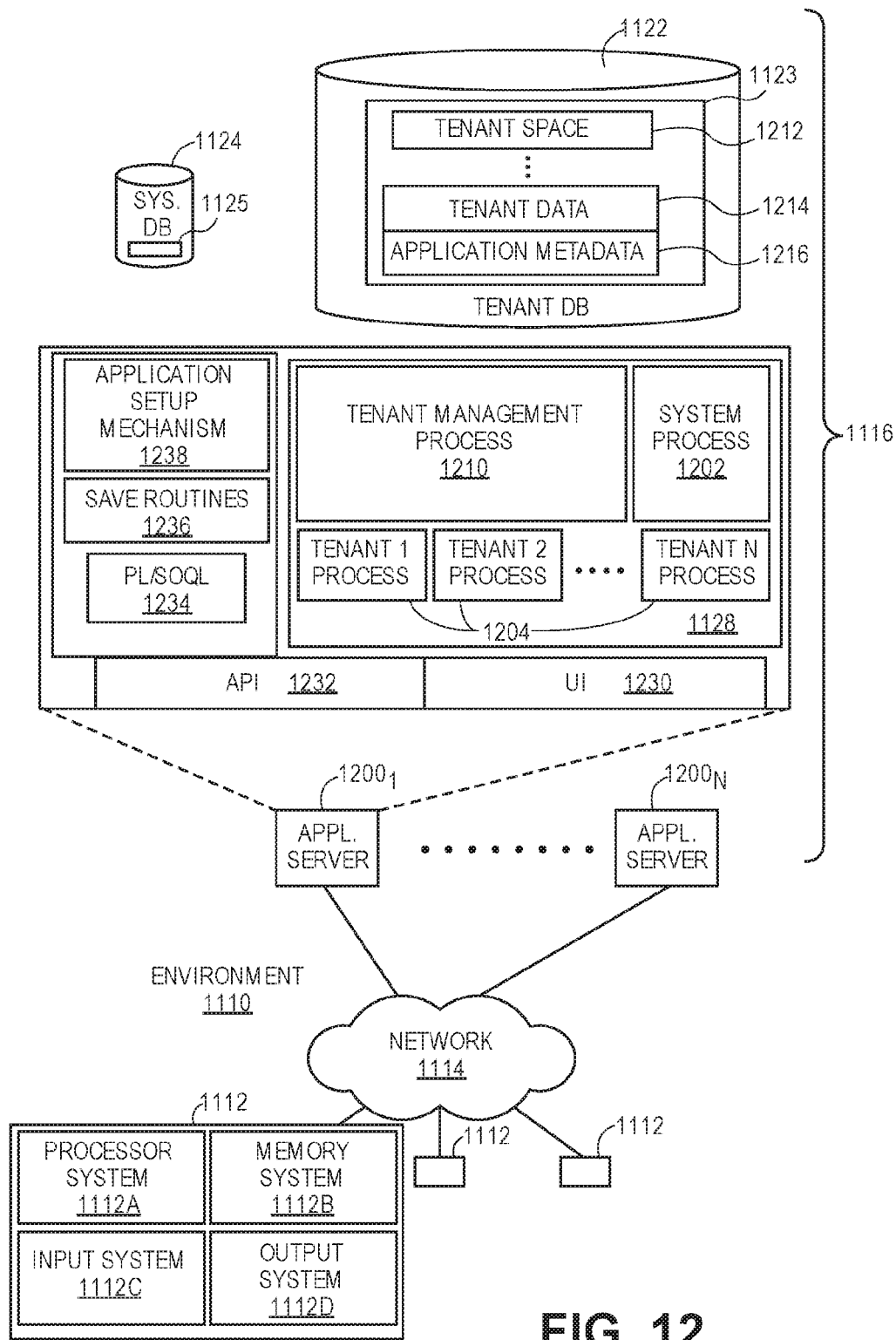
FIG. 12 illustrates a block diagram of an environment where an on-demand database service might be provided.

FIG. 12 also illustrates environment 1110. However, in FIG. 12 elements of system 1116 and various interconnections in an embodiment are further illustrated. FIG. 12 shows that user system 1112 may include processor system 1112A, memory system 1112B, input system 1112C, and output system 1112D. FIG. 12 shows network 1114 and system 1116. FIG. 12 also shows that system 1116 may include tenant data storage 1122, tenant data 1123, system data storage 1124, system data 1125, User Interface (UI) 1230, Application Program Interface (API) 1232, PL/SOQL 1234, save routines 1236, application setup mechanism 1238, applications servers 12001-400N, system process space 1202, tenant process spaces 1204, tenant management process space 1210, tenant storage area 1212, user storage 1214, and application metadata 1216. In other embodiments, environment 1110 may not have the same elements as those listed above and/or may have other elements instead of, or in addition to, those listed above.

User system 1112, network 1114, system 1116, tenant data storage 1122, and system data storage 1124 were discussed above in FIG. 11. Regarding user system 1112, processor system 1112A may be any combination of one or more processors. Memory system 1112B may be any combination of one or more memory devices, short term, and/or long term memory. Input system 1112C may be any combination of input devices, such as one or more keyboards, mice, trackballs, scanners, cameras, and/or interfaces to networks. Output system 1112D may be any combination of output devices, such as one or more monitors, printers, and/or interfaces to networks. As shown by FIG. 12, system 1116 may include a network interface 1120 (of FIG. 11) implemented as a set of HTTP application servers 1200, an application platform 1118, tenant data storage 1122, and system data storage 1124. Also shown is system process space 1202, including individual tenant process spaces 1204 and a tenant management process space 1210. Each application server 1200 may be configured to tenant data storage 1122 and the tenant data 1123 therein, and system data storage 1124 and the system data 1125 therein to serve requests of user systems 1112. The tenant data 1123 might be divided into individual tenant storage areas 1212, which can be either a physical arrangement and/or a logical arrangement of data. Within each tenant storage area 1212, user storage 1214 and application metadata 1216 might be similarly allocated for each user. For example, a copy of a user's most recently used (MRU) items might be stored to user storage 1214. Similarly, a copy of MRU items for an entire organization that is a tenant might be stored to tenant storage area 1212. A UI 1230 provides a user interface and an API 1232 provides an application programmer interface to system 1116 resident processes to users and/or developers at user systems 1112. The tenant data and the system data may be stored in various databases, such as one or more Oracle™ databases.

Application platform 1118 includes an application setup mechanism 1238 that supports application developers' creation and management of applications, which may be saved as metadata into tenant data storage 1122 by save routines 1236 for execution by subscribers as one or more tenant process spaces 1204 managed by tenant management process 1210 for example. Invocations to such applications may be coded using PL/SOQL 1234 that provides a programming language style interface extension to API 1232. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service" issued Jun. 1, 2010 to Craig Weissman, which is incorporated in its entirety herein for all purposes. Invocations to applications may be detected by one or more system processes, which manage retrieving application metadata 1216 for the subscriber making the invocation and executing the metadata as an application in a virtual machine.

Each application server 1200 may be communicably coupled to database systems, e.g., having access to system data 1125 and tenant data 1123, via a different network connection. For example, one application server 12001 might be coupled via the network 1114 (e.g., the Internet), another application server 1200N-1 might be coupled via a direct network link, and another application server 1200N might be coupled by yet a different network connection. Transfer Control Protocol and Internet Protocol (TCP/IP) are typical protocols for communicating between application servers 1200 and the database system. However, it will be apparent to one skilled in the art that other transport protocols may be used to optimize the system depending on the network interconnect used.

In certain embodiments, each application server 1200 is configured to handle requests for any user associated with any organization that is a tenant. Because it is desirable to be able to add and remove application servers from the server pool at any time for any reason, there is preferably no server affinity for a user and/or organization to a specific application server 1200. In one embodiment, therefore, an interface system implementing a load balancing function (e.g., an F5 Big-IP load balancer) is communicably coupled between the application servers 1200 and the user systems 1112 to distribute requests to the application servers 1200. In one embodiment, the load balancer uses a least connections algorithm to route user requests to the application servers 1200. Other examples of load balancing algorithms, such as round robin and observed response time, also can be used. For example, in certain embodiments, three consecutive requests from the same user could hit three different application servers 1200, and three requests from different users could hit the same application server 1200. In this manner, system 1116 is multi-tenant, wherein system 1116 handles storage of, and access to, different objects, data and applications across disparate users and organizations.

As an example of storage, one tenant might be a company that employs a sales force where each salesperson uses system 1116 to manage their sales process. Thus, a user might maintain contact data, leads data, customer follow-up data, performance data, goals and progress data, etc., all applicable to that user's personal sales process (e.g., in tenant data storage 1122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1116 might also maintain system level data usable by multiple tenants or other data. Such system level data might include industry reports, news, postings, and the like that are sharable among tenants.

In certain embodiments, user systems 1112 (which may be client systems) communicate with application servers 1200 to request and update system-level and tenant-level data from system 1116 that may require sending one or more queries to tenant data storage 1122 and/or system data storage 1124. System 1116 (e.g., an application server 1200 in system 1116) automatically generates one or more SQL statements (e.g., one or more SQL queries) that are designed to access the desired information. System data storage 1124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. While the invention has been described in terms of several embodiments, those skilled in the art will recognize that the invention is not limited to the embodiments described, but can be practiced with modification and alteration within scope of the appended claims.

What is claimed is:

1. A non-transitory computer-readable medium having stored thereon instructions that, when executed by one or more hardware processors, are configurable to cause the one or more processors to:

maintain an entries array having a pre-selected number of initially empty buckets and structured as a circular array in a physical memory system coupled with the one or more hardware processors, wherein each of the pre-selected number of entries in the entries array has a corresponding index value;

maintain a chaining array having the pre-selected number of buckets and structured as a circular array in the physical memory system coupled with the one or more hardware processors, wherein each of the pre-selected number of entries in the chaining array has the same corresponding index value as the corresponding bucket in the entries array;

perform a hash operation on data to be stored to determine a hash value corresponding to the data with the one or more hardware processors;

store the data in a bucket in the entries array corresponding to the hash value as an unmovable head-of-chain entry, and moving previous data, if any, stored in the entries array corresponding to the hash value when the previous data has a different hash value;

store the data in another bucket in the entries array when the bucket in the entries array corresponding to the hash value is occupied by a head-of-chain entry;

link the bucket storing the data to the head-of-chain entry with the chaining array with the one or more hardware processors.

2. The non-transitory computer-readable medium of claim 1 wherein a sign bit in the corresponding chaining array entry indicates whether the corresponding entries array bucket contains a head-of-chain entry or a tail-of-chain entry.

3. The non-transitory computer-readable medium of claim 1 further comprising instructions that, when executed by one or more processors, are configurable to cause the one or more processors to displace a movable tail-of-chain entry from the bucket in the entries array corresponding to the hash value to a free bucket within the entries array.

4. The non-transitory computer-readable medium of claim 3 wherein the free bucket within the entries array is within a maximum chaining range.

5. The non-transitory computer-readable medium of claim 1 further comprising instructions that, when executed by one or more processors, are configurable to find the free bucket by analyzing the entries array within a maximum chaining range.

6. The non-transitory computer-readable medium of claim 5 wherein the analyzing the entries comprises linear probing up to the maximum chaining range.

7. The non-transitory computer-readable medium of claim 1 further comprising instructions that, when executed by one or more processors, are configurable to recursively displace one or more tail-of-chain entries in the entries array to free a bucket to add new data in the entries array when there is no free bucket available within the maximum chaining range.

8. The non-transitory computer-readable medium of claim 7 further comprising instructions that, when executed by one or more processors, are configurable to enlarge both the entries array and the chaining array if no free bucket can be found within a maximum chaining range through recursive displacement.

9. The non-transitory computer-readable medium of claim 8 further comprising re-hashing and restoring data stored in buckets of the entries array in response to enlargement of the entries array and the chaining array.

10. The non-transitory computer-readable medium of claim 9 further comprising re-hashing and restoring data stored in buckets of the entries array in response to enlargement of the entries array and the chaining array.

11. The non-transitory computer-readable medium of claim 1 further comprising instructions that, when executed by one or more processors, are configurable to enlarge both the entries array and the chaining array if no free bucket can be found within a maximum chaining range.

12. A computer-implemented method comprising:
    maintaining, with one or more processors, an entries array having a pre-selected number of initially empty buckets and structured as a circular array in a physical memory system coupled with one or more hardware processors, wherein each of the pre-selected number of entries in the entries array has a corresponding index value;
    maintaining, with one or more processors, a chaining array having the pre-selected number of buckets and structured as a circular array in the physical memory system coupled with the one or more hardware processors, wherein each of the pre-selected number of entries in the chaining array has the same corresponding index value as the corresponding bucket in the entries array;
    performing, with one or more processors, a hash operation on data to be stored to determine a hash value corresponding to the data;
    storing, with one or more processors, the data in a bucket in the entries array corresponding to the hash value as an unmovable head-of-chain entry, and moving previous data, if any, stored in the entries array corresponding to the hash value when the previous data has a different hash value;
    storing, with one or more processors, the data in another bucket in the entries array when the bucket in the entries array corresponding to the hash value is occupied by a head-of-chain entry;
    linking, with one or more processors, the bucket storing the data to the head-of-chain entry with the chaining array.

13. The method of claim 12 wherein a sign bit in the corresponding chaining array entry indicates whether the corresponding entries array bucket contains a head-of-chain entry or a tail-of-chain entry.

14. The method of claim 12 further comprising displacing, with one or more processors, a movable tail-of-chain entry from the bucket in the entries array corresponding to the hash value to a free bucket within the entries array.

15. The method of claim 14 wherein the free bucket within the entries array is within a maximum chaining range.

16. The method of claim 12 further comprising finding, with one or more processors, the free bucket by analyzing the entries array within a maximum chaining range.

17. The method of claim 16 wherein the analyzing the entries comprises linear probing up to the maximum chaining range.

18. The method of claim 12 further comprising instructions that, when executed by one or more processors, are configurable to recursively displace one or more tail-of-chain entries in the entries array to free a bucket to add new data in the entries array when there is no free bucket available within the maximum chaining range.

19. The method of claim 18 further comprising instructions that, when executed by one or more processors, are configurable to enlarge both the entries array and the chaining array if no free bucket can be found within a maximum chaining range through recursive displacement.

20. The method of claim 19 further comprising re-hashing and restoring data stored in buckets of the entries array in response to enlargement of the entries array and the chaining array.

21. The method of claim 12 further comprising instructions that, when executed by one or more processors, are configurable to enlarge both the entries array and the chaining array if no free bucket can be found within a maximum chaining range.

22. The method of claim 21 further comprising re-hashing and restoring data stored in buckets of the entries array in response to enlargement of the entries array and the chaining array.

* * * * *